Jan. 2, 1968 E. A. HAUCK 3,362,014

INFORMATION PATTERN CONVERSION CIRCUIT

Filed Dec. 2, 1963 5 Sheets-Sheet 1

INVENTOR.
ERWIN A. HAUCK
BY
Christie, Parker & Hale
ATTORNEYS.

Jan. 2, 1968 E. A. HAUCK 3,362,014

INFORMATION PATTERN CONVERSION CIRCUIT

Filed Dec. 2, 1963 5 Sheets-Sheet 2

INVENTOR.
ERWIN A. HAUCK

BY Christie, Parker & Hale
ATTORNEYS

INVENTOR.
ERWIN A. HAUCK
BY
Christie, Parker & Hale
ATTORNEYS.

United States Patent Office 3,362,014

Patented Jan. 2, 1968

3,362,014
INFORMATION PATTERN CONVERSION CIRCUIT

Erwin A. Hauck, Arcadia, Calif., assignor to Burroughs Corporation, Detroit, Mich., a corporation of Michigan
Filed Dec. 2, 1963, Ser. No. 327,383
17 Claims. (Cl. 340—172.5)

This invention relates to information pattern conversion circuits, and more particularly to circuits for converting input information having a pattern and repetition rate which is not compatible for a utilization circuit into a pattern and repetition rate which is compatible for the utilization circuit.

Today's high-speed information handling systems often require circuits capable of recovering information in one pattern and speed and converting and dispersing this same information at a different pattern and speed. Such circuits must be capable of performing this conversion operation in both directions without altering the information content during the conversion operation.

One of the many examples where such a conversion operation may be required is found in the information control unit for memory stores which utilize an interlace information format. A discussion of one interlacing format may be found in an application having Ser. No. 306,365, filed on Sept. 3, 1963, and now abandoned, by R. A. Gleim, E. A. Hauck, and R. C. Simonsen and assigned to the same assignee as the present invention and application. Reference to the above-identified application may be made if a detailed description of interlacing is desired. Briefly, however, information interlacing requires that word groups making up more than one record are stored on a memory store in a format wherein words from each record are alternated with words from a second and different record. An information control unit for an interlaced memory must be capable of reading or recovering a desired record from the memory; and also, capable of writing or storing a desired record on the memory. When reading a desired record, word recovery is performed during what are termed, active periods. These active periods alternate with inactive periods during which interlaced words of an undesired record are passed over. No information is recovered during these inactive periods.

A word which is recovered during an active period is in the form of pulses having a much higher repetition rate than that which can be handled by an associated utilization circuit to which the memory store recovery circuit must be mated. In some instances, where memory stores such as disk files are employed, words of different records have different pulse repetition rates depending upon the radial distance from the center of the disk where the desired record is located. The utilization circuits for these words are often only capable of operating with continuous information trains, as opposed to pulse bursts followed by inactive periods.

It is clear from the foregoing that wide discrepancies may exist in the pulse patterns and speed handling capabilities of an information control unit and its utilization circuit. Accordingly, when mating this equipment, it is necessary to provide a circuit which is capable of converting pulse bursts recovered at any one of several possible pulse repetition rates into a continuous train of information at another repetition rate which can readily be handled by the circuit to which the converted pulses are applied.

This discussion presented above has been limited mainly to information recovery, i.e., high speed to slow speed, and has not considered the problems involved in a write operation wherein a continuous pulse train at one repetition rate must be converted to pulse bursts at a second repetition rate. Without delving into the details of this latter operation, suffice it to say that economy of operation requires one conversion circuit capable of efficiently performing both operations.

Prior art approaches toward solutions to problems similar to the above-mentioned problems have not proved satisfactory. One standard approach in the prior art involves designing a number of delay pads, which pads each have different built-in delay periods. Successive information pulses of a high-speed information burst are gated through an appropriate delay pad and are recombined at the delay pad outputs as a continuous train of slow-speed pulses. Such delay pads are unsatisfactory since they are temperature sensitive and are subject to a wide tolerance range in their design. When using delay pads for high-speed pulse conversion, the pads for the pulses at the tail end of an information burst, of necessity, have longer built-in delays than the delay pads for the first pulses in the information burst. Temperature changes affect each one of these different delay pads by different amounts. Accordingly, temperature changes commonly result in such wide displacements in time for the various pulses that the recombined information does not accurately represent the input information. In addition, such pads are not adjustable, but require fixed amounts of delay for each different input repetition rate. Thus, considerable component and circuitry duplication exists when such pads are employed in converters which have several possible different input repetition rates.

Schemes employing routing matrices and priority gates have been employed in the past in order to overcome the above-mentioned problems presented by the use of delay pads. Such schemes, in general, are complex and require many circuit components and critical timing requirements. In addition, many of these priority gating schemes are limited to a unidirectional converting operation unless extensive circuit duplication is provided. This duplication is undesirable since it is expensive and space-consuming.

This invention overcomes the above-mentioned problems of the prior art and provides a simple and efficient circuit which involves a minimum amount of component duplication and is capable of converting information pulse bursts having a high repetition rate into continuous information pulse trains at a low repetition rate; or, is capable of converting continuous information pulse trains of a slow repetition rate into information bursts having a high repetition rate.

In accordance with the principles of this invention, an information conversion circuit is provided which has its output connected to a utilization circuit which is limited to reception of pulses at a continuous and slow output repetition rate. The conversion circuit derives its input from a source which delivers input information in a pattern of high repetition rate pulses during an active period and no pulses during an inactive period. This input pulse pattern is applied in series form to a first one of a plurality of storage means which all have a common pulse advance circuit connected thereto. A source of advance signals is connected to the advance circuit and is operative for advancing each input pulse through the plural storage means at the input repetition rate during the active period, and is operative for advancing the input pulses through the storage means at the output repetition rate during the inactive period. Output leads from each storage means are individually connected to a plurality of gating devices which have their outputs connected in common and to the utilization circuit. Control leads from these gating devices are connected to a source which provides gate enabling signals at the output repetition rate, which source enables all of the gating means in sequence during an active period, and enables a single gate repetitively during the inactive period.

Also in accordance with the principles of this invention, means are provided by which the roles played by the input circuit and the utilization circuit may be reversed when a conversion operation opposite to the one described hereinbefore is required. With these circuits reversed, the input pulses for the conversion circuit are in the form of a continuous pulse train at a low repetition rate, and the output pulses required by the utilization circuit must conform to a pulse pattern having a pulse burst of high repetition rate pulses during an active period and no pulses during an inactive period. In this conversion operation, the input pulses are applied, in serial form, to the plurality of storage means during an inactive period for the utilization circuit, and are advanced at the input repetition rate in order to preload a first portion of the input train into the storage means during this inactive period. At the commencement of the active period for the utilization circuit, the preloaded pulses in the storage means are advanced, at the output repetition rate, to the last storage means in the series and are gated out in an order which substantially is the inverse of the prior-described gating operation. Thus, during one portion of the active period a single gate is repetitively enabled at the output repetition rate in order to sequentially apply the preloaded input pulses to the utilization circuit at the output repetition rate. During the remaining portion of the active period, input pulses are advanced through the storage means at the input repetition rate; and, starting with the above-mentioned single gate, all of the gating means are enabled in an inverse sequential order at the output repetition rate in order to complete the information conversion operation during the active period for the utilization circuit.

Thus, in accordance with the principles of this invention, my novel conversion circuit includes a single storage means which may be shifted and gated in either one of two unique timing sequences in order to convert a high-speed pulse burst pattern to a slow-speed continuous pulse train pattern, or vice versa.

This invention may best be understood by reference to the accompanying drawings in which.

Figure 1:
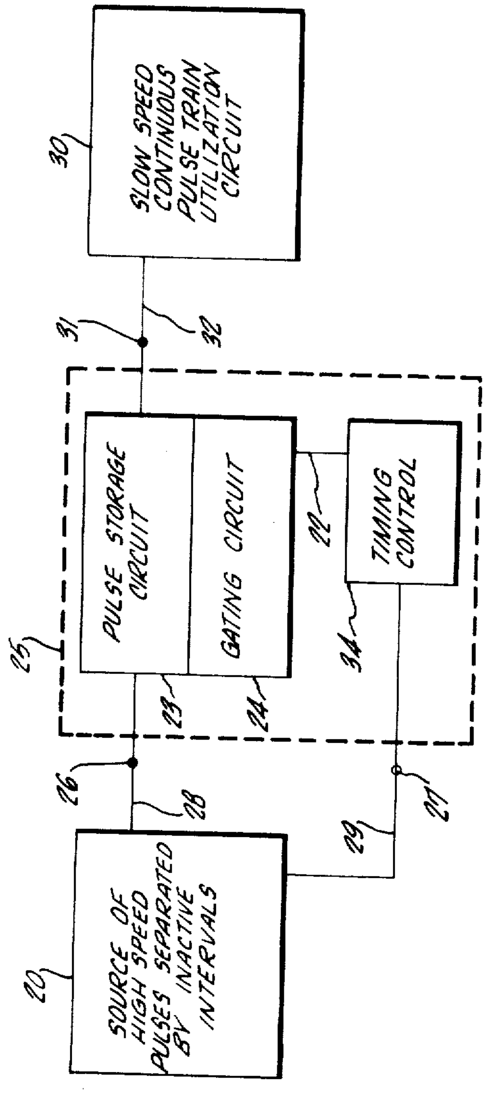
FIG. 1 shows in block form the converter circuit of this invention employed to convert a high-speed pulse burst pattern to a slow-speed continuous pulse train pattern.

FIG. 1 shows one information pulse pattern conversion operation in which a high-speed pulse burst pattern is converted to a slow-speed continuous pulse train pattern. In FIG. 1 a source 20 is connected to the converter circuit 25, of this invention, at input terminals 26 and 27 by leads 28 and 29. Output terminal 31 of converter circuit 25 is connected to a utilization circuit 30 by lead 32. The converter circuit 25 includes a pulse storage circuit 23, a gating circuit 24 and a timing control source 34. Input source 20 delivers input information in a pattern of several high repetition rate binary coded pulses during an active word period, and no pulses during an inactive word period. Each of these active and inactive words in the input pulse pattern are marked by a word mark signal on lead 29 which occurs at the beginning of each of these words. This word mark may be obtained from the word mark clock track in the manner described in the above-identified Gleim et al. patent application. Lead 29 is connected to input terminal 27 of timing control 34, which timing control is operative in accordance with these marking signals and other clocking signals which will be described hereinafter to produce a series of timing signals on output lead 22. These output timing signals control the storage and gating of the input information so that the high speed pulse burst pattern is converted to a slow-speed continuous pulse train pattern at output terminal 31.

Figure 2:
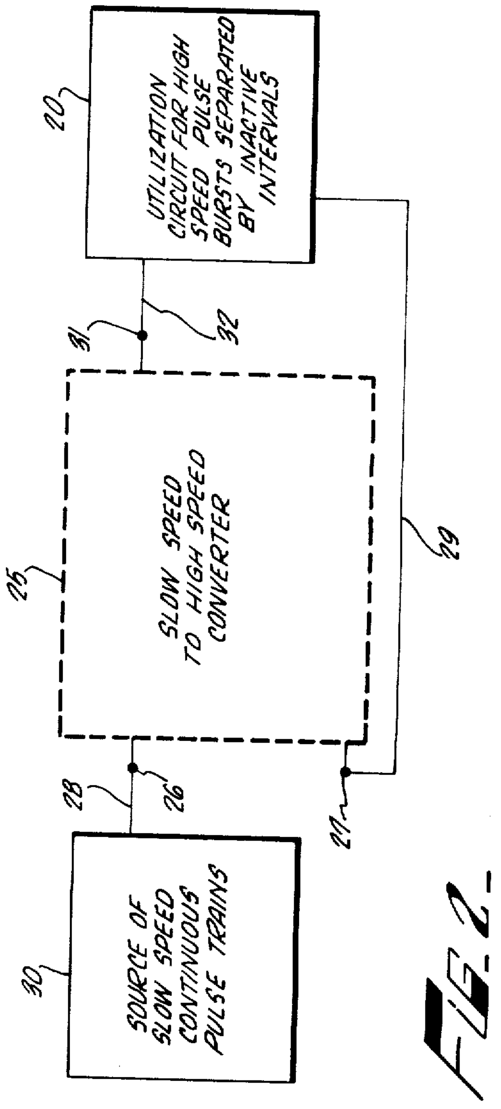
FIG. 2 shows in block form the pulse converter circuit of this invention employed to convert a slow-speed continuous pulse train pattern to a high-speed pulse burst pattern.

FIG. 2 shows the pulse converter circuit 25 of this invention operating as a slow-speed to high-speed converter in which the roles of the source 20 and the circuit 30 have been reversed. Thus, a source 30 of slow-speed continuous pulse trains now becomes the input source which is connected to input terminal 26 of converter circuit 25 by lead 28; and the high-speed pulse source 20 now becomes a utilization circuit which is connected to output terminal 31 of converter circuit 25 by lead 32 and to input terminal 27 by lead 29. In the conversion operation of FIG. 2 the active and inactive word mark signals are again applied by lead 29 to input terminal 27 of converter circuit 25 from high-speed pulse circuit 20.

Figure 3:
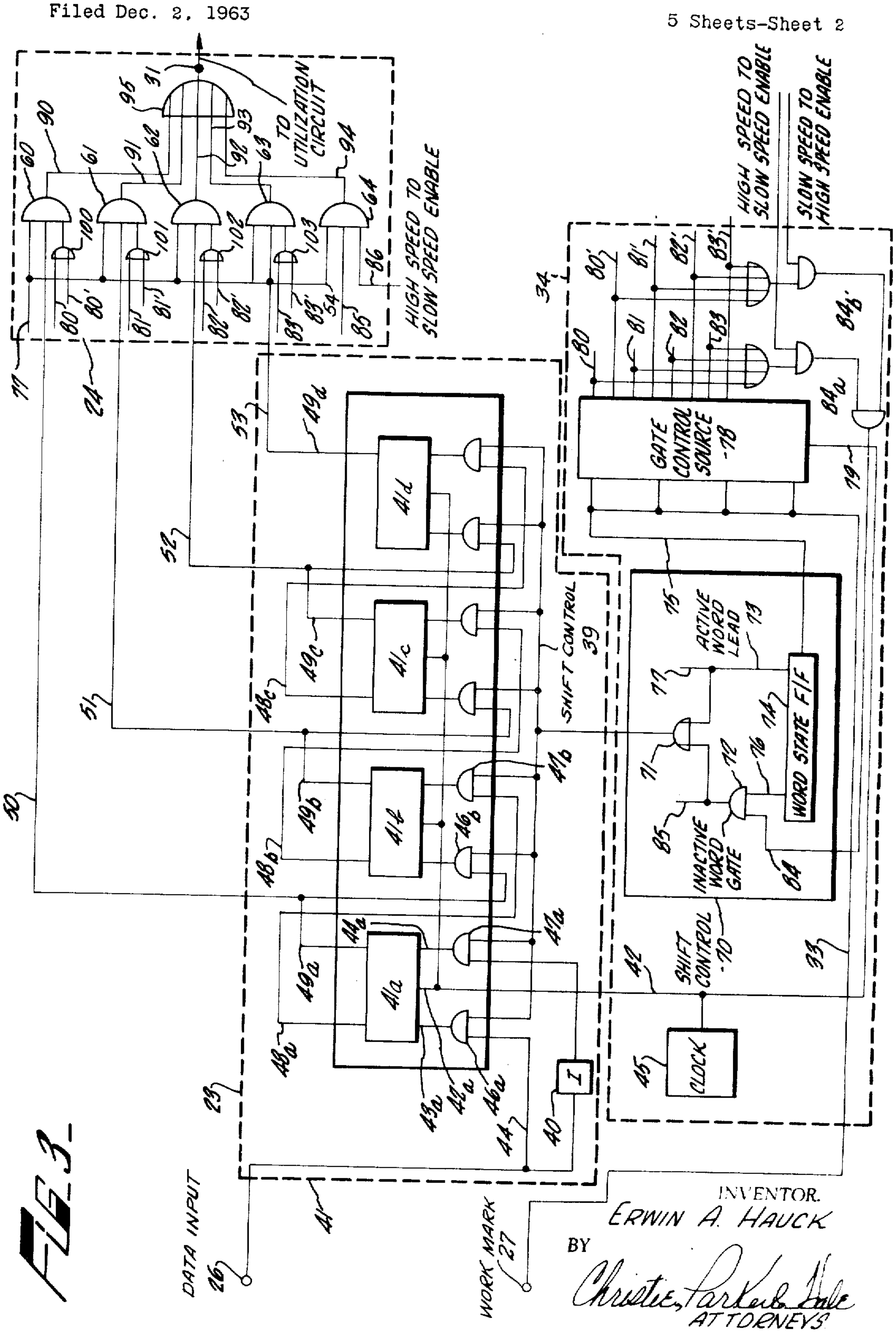
FIG. 3 is a detailed schematic diagram of the converter circuit of FIGS. 1 and 2.

FIG. 3 shows a schematic block diagram of the converter circuit 25 of FIGS. 1 and 2. Assuming first that a high-speed pulse burst pattern is converted to a slow-speed continuous pulse train operation, input terminal 26 of FIG. 3 would have this high-speed information appearing in serial fashion thereat. This single input 26 is converted to a two-rail input for shift register 41 of storage circuit 23 by inverter circuit 40 and is applied to a first stage $41_a$ of the shift register 41.

Each stage of shift register 41 is identical and is comprised of a complementing flip-flop which has a clock input 42, two information inputs 43 and 44 and two information outputs 48 and 49. Since each stage of shift register 41 is identical, only the first stage $41_a$ thereof will be described in detail. The first stage of shift register 41 comprises a complementing flip-flop $41_a$ having clock input $42_a$ connected to the output of a clock source 45 by lead 42. The complementing inputs $43_a$ and $44_a$ for flip-flop $41_a$ are connected to the outputs of AND gates $46_a$ and $47_a$ respectively. Binary coded information, which may advantageously be of the non-return to zero type such as that shown representatively in the top line of FIG. 4, appears at terminal 26 and is applied to AND gates $46_a$ and $47_a$ via lead 44 and inverter circuit 40, respectively. The flip-flop $41_a$ will assume a 0 or 1 state depending upon the polarity, or information content, of the input information which is applied to the input AND gates at the time of a clock pulse from source 45 on lead 42. The output leads $48_a$ and $49_a$ from flip-flop $41_a$ are connected to the input AND gates $46_b$ and $47_b$, respectively, of the second stage of shift register 41 in order to form a standard shift register circuit.

Output lead $49_a$ from flip-flop $41_a$ is connected by an output lead 50 to an AND gate 60. In a similar manner, each of the output leads $49_b$, $49_c$, and $49_d$ from flip-flops $41_b$ through $41_d$ of shift register 41 are individually connected by leads 51 through 53 to AND gates 61 through 63, respectively. AND gate 64 is also connected to output lead $49_d$ by lead 54.

The shift register 41 has a shift control lead 39 connected in parallel to all of the input AND gates 46 and 47. This shift control lead 39 is driven by a shift control source 70 which includes an OR gate 71, an inactive word AND gate 72, an active word lead 73 and a word state flip-flop 74. The word state flip-flop 74 advantageously is any single input double output flip-flop known to the prior art which is set in one state by a first pulse on its input lead 75 and is set in a second state by the next input pulse on lead 75. The input pulses which control the states of flip-flop 74 are derived from the word mark signals applied to input terminal 27 from the high-speed pulse source 20 of FIG. 1.

Word mark signals appearing at terminal 27 also serve as reset pulses on lead 33 for the gate control source 78. Gate control 78 advantageously may be any standard binary counter known in the art, in which flip-flop circuits therein are connected in a known manner to perform a counting operation for each clock pulse on lead 79 from clock source 45 after a reset operation at lead 33. Gate control source 78 has output leads 80 through 83 which are individually connected to AND gates 60 through 63, via the isolating OR gates 100, 101, 102, 103 and leads 80′ through 83′ which are individually connected to AND gates 60 through 63 via OR gates 100, 101, 102, 103. These output leads of gate control 78 are energized for selected intervals in order to deliver gate enabling signals to gates 60 through 63.

Gates 60 through 63, in addition to the inputs from gate control source 78, derive input signals from the active side of the word state flip-flop 74. Gate 64 derives an input signal from the inactive side of word state flip-flop 74. Each of the gates 60 through 64 has a single output lead 90 through 94 respectively, which outputs are connected through an OR gate 95 to output terminal 31. Output terminal 31 is connected via lead 32 to a utilization circuit which may be either the slow-speed source 30 or the high-speed source 20 depending upon the particular conversion operation.

Figure 4:
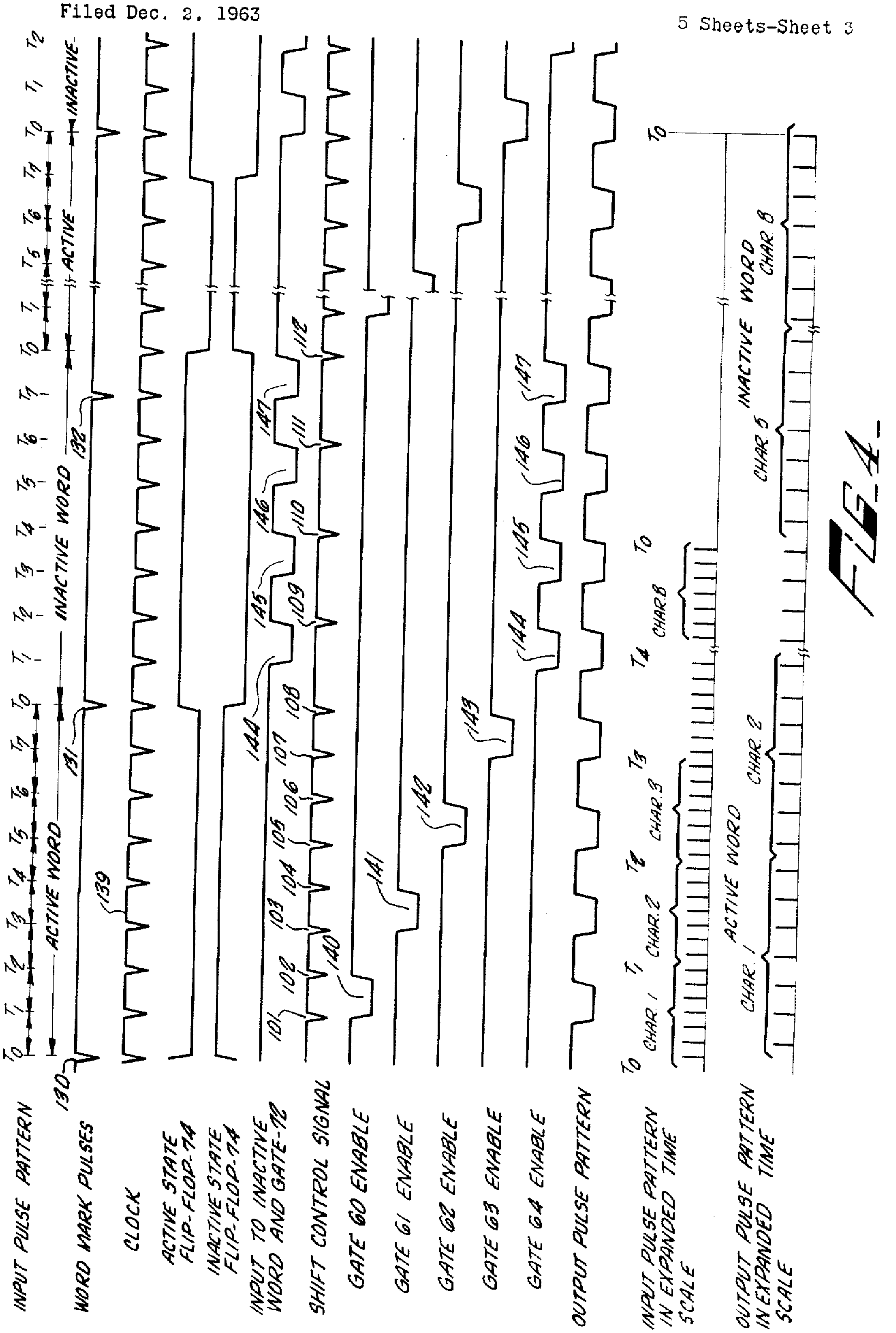
FIG. 4 depicts wave form and timing charts helpful in the understanding of a high-speed to slow-speed conversion operation of FIGS. 1 and 3.

The operation of the conversion circuit of FIG. 3 may best be understood by reference to the wave form and timing charts of FIG. 4. As shown in FIG. 4, an input pulse pattern in the form of an active word, shown by double-headed arrows, is followed by an inactive word of no pulses. This pattern is applied to the input terminal 26 of FIG. 3. Although no signal polarities (representative of binary bits) are shown only during the time intervals $T_0$ through $T_7$ of an active word, it should be understood that such binary coded pulses representing either a 0 or 1 will, of course, appear in various random combinations during the entire active word period. A word mark pulse 130, defining the beginning of an active word is present on input terminal 27 of FIG. 3. A continuous stream of clock pulses 139 occur at each of the intervals $T_0$ through $T_7$ of both an active and inactive word. These clock pulses are generated by clock source 45 of FIG. 3 which may be any standard clock source known to the prior art. For example, such clock pulses may be generated by a crystal oscillator which is adjusted to continually produce output signals at the same repetition rate as the pulses from the high-speed pulse source 20 of FIG. 1.

At time $T_0$ of FIG. 4 a word mark pulse 130 appearing on input terminal 27 of FIG. 3 resets the gate control source 78 and establishes the word state flip-flop 74 in an active word state as shown in FIG. 4. Simultaneously with the occurrence of word mark pulse 130, is the presentation of a first information input pulse at terminal 26. This input pulse is converted to a two-rail input for either input AND gate 46$_a$ or AND gate 47$_a$ of the first stage of shift register 41 depending upon the information content of the input pulse. Since the word state flip-flop 74 is in an active condition at time $T_0$, active word lead 73 is satisfied and an output signal through OR gate 71 is applied to shift control lead 39. The information content of this first input pulse will be placed in flip-flop 41$_a$ by a clock pulse 139 on lead 42 from clock source 45 at time $T_1$. This clock pulse thus functions as a shift control signal 101 at time $T_1$ in that it has, during the time interval $T_0$ through $T_1$, stored the first binary information bit presented at terminal 26 into the first shift register stage 41$_a$.

The state of the first stage of shift register 41 at time $T_1$ thus represents the binary value of the first data input pulse. This state of flip-flop 41$_a$ is reflected at output lead 49$_a$ which is connected by lead 50 to AND gate 60. One of the coincident signals which is necessary for conduction in AND gate 60, and AND gates 61 through 63 as well, is the presence of an active word signal on lead 77 which is connected to the active side of word state flip-flop 74 of shift control source 70. Thus, at time $T_1$ there is coincidence between an active signal on lead 77 for AND gate 60 and the state of stage 41$_a$ as presented at output lead 50 from the first stage of register 41. The third and remaining input signal which is required for satisfaction of AND gate 60 is derived from lead 80 of gate control source 78. Output lead 80 from gate control source 78 is energized at time $T_1$, and a gate enable pulse 140 is delivered to AND gate 60. This gate enable pulse 140 for AND gate 60 is present for an entire pulse period $T_1$ through $T_2$; and AND gate 60, output lead 90 and OR gate 95 cooperate during this time period as a transmission gate for accurately reproducing the binary condition represented by the state of stage 41$_a$ at output terminal 31.

The state of flip-flop 41$_a$ is also applied to the input AND gates 46$_b$ and 47$_b$ of flip-flop 41$_b$ at time $T_1$. At time $T_2$ another clock pulse 139 functions as a shift control signal 102 in order to shift and store the information content which was previously in stage 41$_a$ into stage 41$_b$. At the same instant, shift control signal 102 sets into stage 41$_a$, the second item of information content present at input terminal 26. This second item of information content being stored in stage 41$_a$ by pulse 102 can not be transmitted to output terminal 31 via gates 60 and 95 because the enabling pulse 140 is terminated by the pulse on lead 79 which is applied by clock 45 so as to advance the gate control source 78.

At time $T_3$, the next clock pulse 139 functions as a shift control signal 103 in order to shift the first and second items of information content from stages 41$_a$ and 41$_b$ respectively into stages 41$_b$ and 41$_c$. Pulse 103 also stores the third item of information content in stage 41$_a$.

Simultaneously with this shifting and storage operation at time $T_3$ is the occurrence of a gate enabling signal 141 at output lead 81 from gate control source 78. This gate enabling signal 141 on output lead 81 enables AND gate 61 for the time interval $T_3$ through $T_4$ and transfers the second item of the information content stored in stage 41$_b$ of shift register 41 to output terminal 31. At time $T_4$ the shift control signal 104 advances the first three items of information content from stages 41$_a$ through 41$_c$ respectively to stages 41$_b$ through 41$_d$ and stores the fourth item of information content in stage 41$_a$.

The next shift control signal 105 at time $T_5$ stores the third item of information content in stage 41$_c$. Also occurring at time $T_5$ is a gate enable signal 142 on output lead 82 of gate control source 78. This gate enable signal 142 is present at the input of AND gate 62 which is connected to the third shift register stage 41$_c$ and operates during the time interval $T_5$ through $T_6$ to transfer the information content from stage 41$_c$ to output terminal 31. In a similar manner shift control signals 106 and 107 at times $T_6$ and $T_7$ place the information content for the fourth input pulse in the last stage 41$_d$ of shift register 41. Also present at time $T_7$ on output lead 83 of gate control source 78 is a gate enable signal 143 which is present for the duration of the time interval $T_7$ to $T_0$. This gate enable signal 143 at the output lead 83 enables AND gate 63 which functions to transmit the pulse information content from stage 41$_d$ to the output terminal 31. A shift control signal 108 at time $T_0$, completes the storage operation for the information-containing pulses 8, 7, 6 and 5 respectively in stages 41$_a$, 41$_b$, 41$_c$ and 41$_d$.

Reviewing the operation thus far during the active word for the input pulse pattern, it should be noted that the information content of the first four input pulses has been shifted through the shift register 41 at a rate equal to the input repetition rate and has been sequentially gated out through gates 60 through 63 from each of the shift register stages $41_a$ through $41_d$, at the output repetition rate in order to reproduce the information content of these first four input information pulses at output terminal 31. The pulse information content for pulses 5 through 8 is shifted in shift register 41 at the output repetition rate during the following inactive word interval. The information content for these pulses is gated out only from stage $41_d$ through the single AND gate 64, also at the output repetition rate in a manner to be described hereinafter. This operation during the inactive word, when completed, produces at output terminal 31 a slow-speed continuous pulse train output which extends over an active and inactive word period.

Inasmuch as time $T_0$ marks the beginning of an inactive word, a word mark pulse 131 appears on input terminal 27 at this time. This word mark pulse 131 resets gate control source 78 and changes the state of word state flip-flop 74. With the state of flip-flop 74 changed to an inactive state as shown in FIG. 4 at time $T_0$, one input pulse on lead 76 of inactive word AND gate 72 is present. Inactive AND gate 72 is a two-input AND gate which obtains its second input signal from output lead 84 of gate control source 78. This output lead 84 is a composite of output leads 80 through 83 in that output signals 144 through 147 appear thereat at time intervals $T_1$, $T_3$, $T_5$, and $T_7$ during the inactive word period. These output signals 144 through 147 at lead 84 control the inactive word AND gate 72 of shift control 70 in such a manner that clock pulses from clock source 45 act as shift control signals 109 through 112 at times $T_2$, $T_4$, $T_6$, and $T_0$ during the inactive word period. The pulses 144 through 147 on lead 85 also function as gate enabling signals for output AND gate 64. This gate 64 is repetitively enabled by these signals during the inactive word period in order to transmit the pulse information content for pulses 5 through 8 from stage $41_d$ to output terminal 31. An enable lead 86 for AND gate 64 is energized during this high-speed to slow-speed conversion operation. This enable lead is not energized, however, during a slow-speed to high-speed conversion operation which will be described later.

In the manner described hereinbefore, gate control source 78 receives a clock pulse 139 at time $T_1$ of the inactive word and generates an output signal 144 on lead 84. This output signal 144 on lead 84 establishes coincidence at the inactive word AND gate 72 which in turn applies a signal through OR gate 71 to shift control lead 39 of shift register 41. This pulse on output lead 85 also functions as a gate enabling signal 144 for AND gate 64 during the time interval $T_1$ through $T_2$; and allows an information transfer from stage $41_d$ of shift register 41 to output terminal 31 during the time interval $T_1$ through $T_2$. This information transfer is terminated at time $T_2$ of the inactive word. Also at time $T_2$, a shift control pulse 109 transfers the information content for the sixth pulse from stage $41_c$ to the stage $41_d$. This shift control pulse 109 also transfers the information content for pulses 7 and 8 respectively into stages $41_c$ and $41_b$. At time $T_3$, another clock pulse 139 occurs on lead 42 from clock source 45. No shifting of information occurs in shift register 41 at this time, however, since output lead 84 does not establish coincidence at the inactive word AND gate 72. Accordingly, no shift control pulse appears at time $T_3$. However, the clock pulse 139 which appears at time interval $T_3$ is counted by gate control source 78, and after the termination of this clock pulse a gate enable signal 145 is emitted by gate control source 78. This pulse 145 satisfies the inactive word AND gate 72 of shift control 70 and also enables the output AND gate 64 during the time interval $T_3$ through $T_4$. Thus, during the time interval $T_3$ through $T_4$ the information content for pulse 6 is transferred from stage $41_d$ through gate 64 to output terminal 31.

The operation described hereinbefore for the first half of the inactive word period repeats itself during the last half of the inactive word period. Thus, the information content for the seventh and eighth pulses is gated out during time intervals $T_5$ through $T_6$, and $T_7$ through $T_0$, from the last stage $41_d$ through gate 64 to output terminal 31.

In view of the foregoing, it is clear that the converter circuit of FIG. 3 has received a pattern of eight high reptition rate pulses during an active word, which pulses are stored and shifted at the input repetition rate during the entire active period. Sequential gating of the gates 60 through 63 at the output repetition rate during this active period reproduces the first four input pulses at the output of the converter circuit at the required output repetition rate for the utilization circuit. Thereafter, during the inactive word which follows, the remaining four input pulses, which were stored in the shift register at the end of the active word, are advanced at half the input repetition rate employed during the active word, and AND gate 64 is repetitively enabled at the output repetition rate during this inactive word in order to complete the transfer of the last four input pulses to the utilization circuit. The converter circuit of FIG. 3, operating in this manner, converts the high repetition rate pulse burst of an active word into a continuous pulse train which extends over an active word and an inactive word.

A word mark pulse 132 which signals another active word changes the state of word state flip-flop 74, and a conversion operation identical to that just described repeats itself in order to convert the next high repetition rate pulse burst into a slow repetition rate continuous pulse train.

Figure 5:
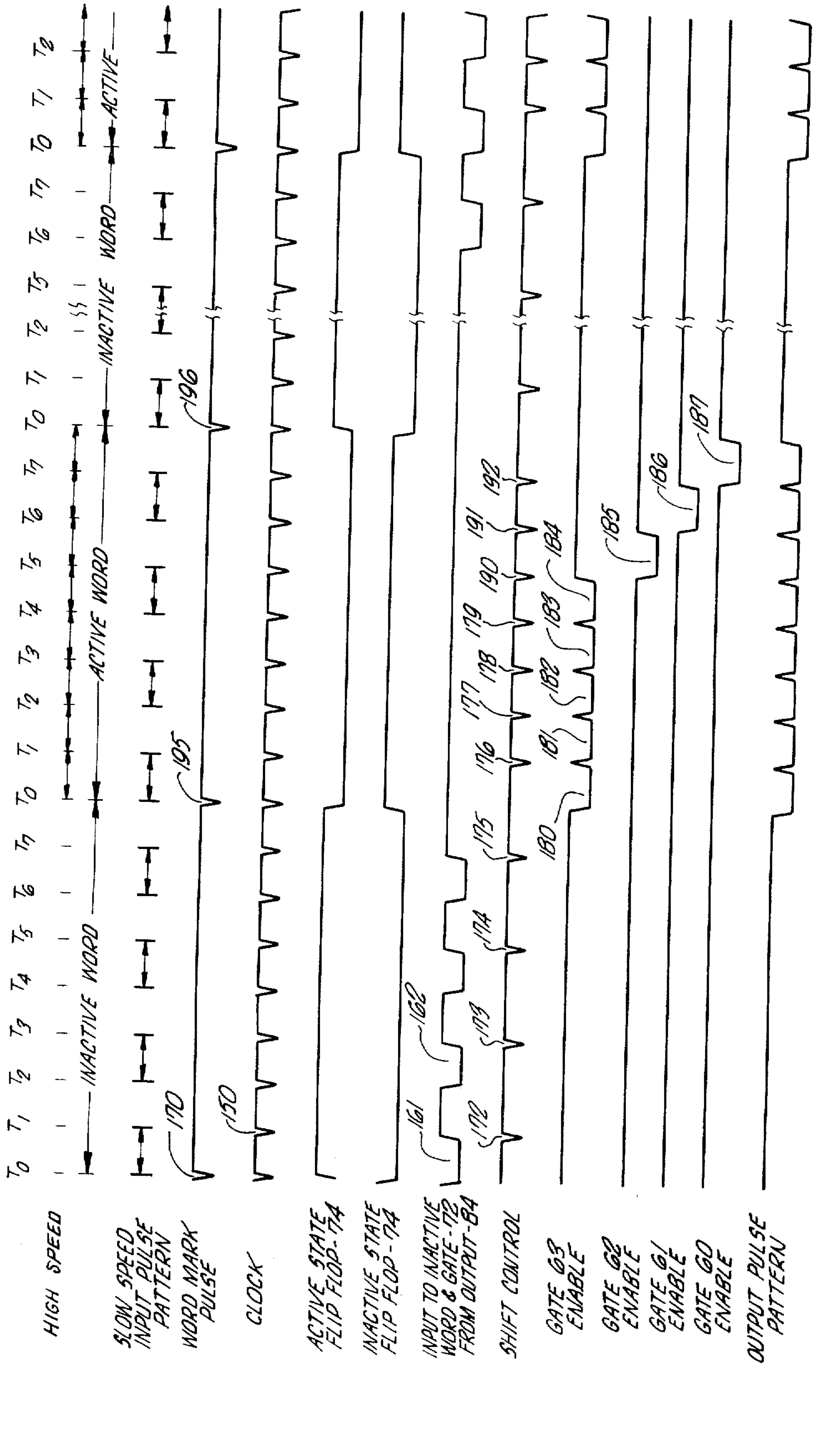
FIG. 5 depicts wave form and timing charts helpful in promoting the understanding of the slow-speed to high-speed conversion operation of FIGS. 2 and 3.

The manner in which the conversion circuit of FIG. 3 operates to convert a continuous pulse train pattern to a high repetition rate pulse burst pattern may best be appreciated by reference to FIG. 5. In FIG. 5 the high-speed pulse pattern is shown having double-headed arrows during the active word intervals in which information must be applied to a high-speed utilization circuit. The slow-speed continuous pulse train pattern which was the output pattern in FIG. 4 is now shown as the input pulse pattern in FIG. 5. In the slow-speed to high-speed conversion operation to be described hereinafter, reference will be made to the conversion circuit of FIG. 3. However, it should be understood that the timing requirements for this conversion operation are different, and thus, would require different outputs from gate control source 78. In addition, when a slow-speed to high-speed conversion is to take place, an enable pulse is not present on lead 86 of AND gate 64 during the entire conversion operation. The slow-speed to high-speed conversion thus requires only gates 60 through 63.

Prior to a detailed discussion of the slow-speed to high-speed conversion operation, a brief summary of this operation is in order. The slow-speed information pulses are shown in FIG. 5 as double-headed arrows at times $T_0$, $T_2$, $T_4$, and $T_6$ of both an inactive and an active word. These pulses are applied in serial fashion at input terminal 26 of FIG. 3 during an inactive word period for the utilization circuit and are advanced at the input repetition rate by the shift control circuit in order to preload the first four input pulses in the shift register 41 during this inactive word period. At the commencement of the active period for the utilization circuit, these preloaded pulses are advanced to, and gated out from, the last stage $41_d$ at the output repetition rate during the first half of the active word period. During the remaining portion of the active word period, the last four input pulses from the slow-speed pulse train are advanced through the shift register at the input repetition rate, and gates 60 through 63 are sequentially enabled in an inverse chronological order at the output repetition rate in order to complete the information conversion operation during the active word period for the utilization circuit.

Reference to FIG. 5 shows the inactive word period for the above-described preloading operation commencing at time $T_0$. At that time a word mark pulse 170 appears at input terminal 27 and establishes the word state flip-flop 74 in its inactive state as shown in FIG. 5. This same word mark pulse resets the gate control source 78, and as shown in FIG. 5, the inactive word AND gate 72 is satisfied by the gate enabling signal 161 on output lead 84 by the next clock on lead 79. This enabling pulse 161 plus the inactive word state of flip-flop 74 allows a clock pulse 150, at time $T_1$, to function as a shift control pulse 172 which sets the information content presented during time interval $T_0$ through $T_1$ into stage $41_a$ of shift register 41. Appearance of a clock pulse 150 at time $T_2$ is counted by gate control 78 which establishes an enabling signal 162 at output lead 84 of gate control source 78. This enables signal 162 satisfies inactive word AND gate 72 and allows the next clock pulse 150 which appears at time $T_3$ to function as a shift control pulse 173. Pulse 173 sets in, at stage $41_a$, the information content of the second input pulse and also sets in, at stage $41_b$, the information content of the first input pulse. In a similar manner, shift control pulses 174 and 175 are generated and are operative to preload the information content for the first four input pulses into stages $41_a$ through $41_b$.

A word mark pulse 195, at time $T_0$, indicates the commencement of an active word period for the utilization circuit. This word mark pulse 195 at input terminal 27 of FIG. 3 resets the gate control source 78 and establishes the word state flip-flop 74 in an active word condition. This active word condition on word state flip-flop 74 satisfies the active word lead 73, and an output pulse through OR gate 71 produces a continuous shift control signal on shift control lead 39. No shift control pulse appears at time $T_0$, however, since the clock control pulse 150 at time $T_0$ serves only to change the state of word state flip-flop 74.

AND gate 64 is not employed for the slow-speed to high-speed pulse conversion operation. Gates 60 through 63 are employed in the slow-speed to high-speed conversion operation and are gated in an inverse order from the gating operation employed in the high-speed to slow-speed conversion which was described hereinbefore. Thus, at time $T_0$, a gate enabling pulse 180 appears on output lead 83' of gate control source 78, which output pulse enables AND gate 63 during the time interval $T_0$ through $T_1$. This enabled condition for gate 63 transfers the information content of the first input pulse from stage $41_d$ through OR gate 95 to the output terminal 31.

Since the active word lead 73 is applying a continuous shift control signal to shift control lead 39, each clock pulse 150 at times $T_1$, $T_2$ and $T_3$, functions as a shift control signal 176, 177, and 178 respectively, in order to transfer each of the preloaded pulses to the last stage $41_d$ of shift register 41. During these time intervals, as shown in FIG. 5, gate 63 has applied thereto gate enabling signals 181 through 183 in order to gate out to output terminal 31 each of the remaining preloaded input signals. These gating signals 181 through 183 are all at the output repetition rate, and thus, the first four signals, which were preloaded in shift register 41 during the inactive word period, appear at the utilization circuit at the output repetition rate during the first half of the active word period for that utilization circuit.

As the first four input signals are advanced through the shift register 41 and gated out through the repetitively enabled AND gate 63, new input information appearing at terminal 26 is being presented and stored in the shift register stages. Thus, shift control pulses 176 through 178, occurring at times $T_1$ through $T_3$, establish the information content for the fifth and sixth input pulses in stages $41_c$ and $41_a$, respectively. Gate enabling pulse 184 which occurs during the time intervals $T_4$ through $T_5$ transfers the information content for the fifth input pulse out through enabled AND gate 63 in the manner described hereinbefore.

As shown in the slow-speed information wave form of FIG. 5, only three new input information pulses, namely, the fifth, sixth and seventh information pulses have been presented to the input terminal 26 during the active word period $T_0$ through $T_5$. The fifth information pulse has been gated out as described above, and shift control pulse 190 at time $T_5$ places the sixth and seventh information pulses in stages $41_c$ and $41_a$, respectively. Gate control source 78 establishes a gate enabling signal 185 on output lead 82' during the time interval $T_5$ through $T_6$. This gate enabling signal activates AND gate 62 in order to transmit the information content for the sixth input pulse to output terminal 31.

Information content for the seventh input pulse is shifted by shift control pulse 191 at time $T_6$ to stage $41_b$ simultaneously with the presentation, at output terminal 81' of gate control source 78, of a gate enabling signal 186. This gate enable pulse 186 is applied to AND gate 61 in order to transfer the information content for the seventh input pulse from stage $41_b$ through OR gate 95 to the output terminal 31.

A shift control pulse 192 at time $T_7$, sets in the last input pulse at stage $41_a$ simultaneosuly with the presentation of gate enabling signal 187 on output lead 80' of gate control source 78. This gate enable signal 187 enables AND gate 60 in order to transfer the information content of the last input pulse from stage $41_a$ through OR gate 95 to output terminal 31.

With the termination of gate enabling signal 187 at the end of the active word period, the information pulse pattern conversion operation is completed. The converted output for the utilization circuit, as shown in FIG. 5, consists of eight consecutive information content pulses at the output repetition rate, which pulses occur during the active word period for the utilization circuit. These pulses are exact duplications of the eight input pulses which appeared as a continuous pulse train extending over an inactive word and an active word period.

A word mark pulse 196 which occurs at time $T_0$ following the active word period, alters the state of the word state flip-flop 74 to its inactive word condition. During this inactive word period the preloading operation described hereinbefore occurs for the next continuous pulse train input. During this inactive period no output pulses appear at terminal 31, and thus, the original continuous input train has been converted into an identical eight-pulse high repetition rate burst during the active word interval for the utilization circuit, which active word is followed at that utilization circuit by an inactive word period of no pulses. During the subsequent inactive and active word periods, the operation described hereinbefore repeats itself in order to convert the next continuous train input into a high repetition rate pulse burst.

The circuit operations described hereinbefore have related to FIG. 3 and the timing diagrams of FIGS. 4 and 5 in order to demonstrate the dual pulse pattern conversion operation of the circuit of this invention. The description up to this point has related solely to the idea that single pulses are present in either the high-speed pulse burst pattern or the slow-speed continuous train pattern, and thus, only one shift register and one gating circuit is required.

Reference to the aforementioned Gleim et al. patent application, however, discloses that each information word of an interlaced format requires several characters each made up of several distinct binary pulses. For example, each character of information may have six information content pulses and a seventh character complete pulse. All of these seven pulses for one character occur during a single time interval such as $T_0$ through $T_1$, of FIG. 4. Such a high-speed input pulse pattern, having characters 1 through 8, which characters each comprise bursts of six information content pulses and one character complete pulse, is shown in FIG. 4 in expanded time scale for the intervals $T_0$ through $T_7$, of an active word.

Figure 6:
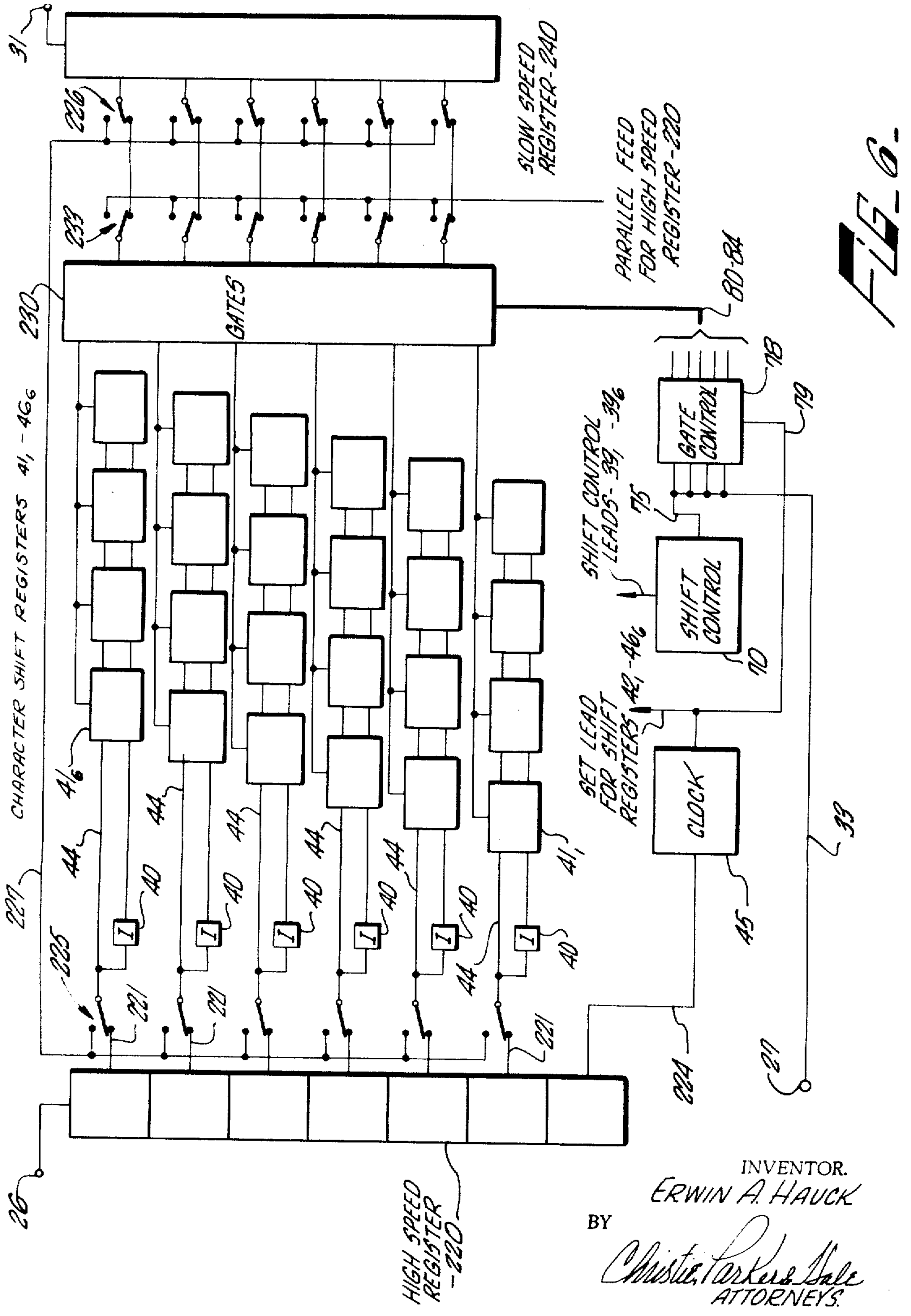
FIG. 6 is a combined schematic and block diagram of a converter circuit for simultaneously converting several pulse patterns either from a high-speed to a slow-speed, or vice versa.

The circuit of FIG. 6 is operative to convert the pulse bursts shown in expanded time scale, in FIG. 4, into a slow-speed plural pulse continuous train pattern, or vice versa.

The operation for a high-speed pulse burst pattern conversion to a slow-speed continuous pulse train pattern by the circuit of FIG. 6 requires six simultaneous conversion operations identical to the operation of the circuit of FIG. 3 described hereinbefore.

Terminal 26 of FIG. 6 would apply the pulse burst for character 1 in series from to a seven-stage high-speed register 220 during a single time interval such as $T_0$ through $T_1$, of FIG. 4. This high-speed register 220 may be any of the typical shift registers known in the prior art. For example, it may be information storage shift register 110 in the aforementioned Gleim et al. patent application. This high-speed register 220 has a plurality of outputs 221 for reading out the pulses stored in each of the stages in parallel at the end of each single time interval. Each of the single outputs 221 provides a two-rail input via closed switches 225, leads 44, and inverter circuits 40 to the first stages of six shift register circuits $41_1$ through $41_6$ in the manner described hereinbefore.

These shift register circuits $41_1$ through $41_6$ are shown only in block form in FIG. 6, and it should be understood that they include the interconnections for the flip-flop input and output leads and the input AND gates of FIG. 3. Each one of the shift registers $41_1$ through $41_6$ derive clock pulses from source 45 via leads $42_1$ through $42_6$, and shift control pulses from source 70 via leads $39_1$ through $39_6$.

A character complete stage is provided for shift register 220 in the manner described in the aforementioned Gleim et al. patent application, for producing an output signal when a parallel read out operation from high-speed register 220 takes place. This character complete signal via lead 224 triggers clock source 45 in order to produce one clock pulse for each complete character stored in shift register 220. These clock pulses control the storing and shifting of information in all of the shift register circuits $41_1$ through $41_6$. Also at time $T_0$, a word mark pulse on terminal 27 resets the gate control source 78 and activates shift control circuit 70. Outputs 80 through 84 from gate control source 78 are connected to six groups of gating circuits identical to the gating circuit 24 of FIG. 3. These six-gate groups, shown in block form as gates 230 in FIG. 6, apply the slow-speed outputs in parallel via closed switches 226 and 233 to the slow-speed shift register 240. Reference to the input pulse pattern in expanded time scale, in FIG. 4, shows that the first repetition rate input characters 1 through 8 of an active word, are converted into the second repetition rate characters 1 through 4 of an active word, and characters 5 through 8 of an inactive word. A detailed discussion of the operation, of FIG. 6, for the conversion shown in the expanded time scales of FIG. 4 is not believed necessary since it involves six simultaneous conversion operations identical to the operation described hereinbefore in reference to FIGS. 3 and 4.

A slow-speed to high-speed pulse conversion operation requires that switches 225, 226 and 233 be closed to their upper terminals. Thus, information from the slow-speed register 240 would be applied in parallel via closed switches 226, cable 227, and closed switches 225 to the input circuits of shift registers $41_1$ through $41_6$. Six simultaneous conversion operations based on the timing sequences shown in FIG. 5 would take place in the manner described in detail hereinbefore by reference to FIGS. 3 and 5. No further detailed discussion of the operation for FIG. 6 is belivered necessary for this slow-speed to high-speed conversion.

It should be understood, of course, that the switches 223, 225 and 226 which are employed in FIG. 6 in order to switch the roles of the input and output sources could be employed in a similar fashion in FIG. 3. Use of these switches in the circuit of FIG. 3 would allow the high-speed source to be an input circuit for one information handling operation which would include several active and inactive word periods; and would thereafter, in a second information handling operation, allow the slow-speed source to be an input circuit during a subsequent input interval which would also include several active and inactive word periods. It should be further understood that switches 225, 226 and 223 may be electronic gating devices.

The above-described arrangements are illustrative of the principles of this invention. Numerous other arrangements may be devised by those skilled in the art without departing from the spirit and scope of this invention.

What is claimed is:

1. A circuit for converting information-containing pulses at an input repetition rate to the same information-containing pulses at a different output repetition rate comprising a register circuit having a plurality of storage devices at least less in number than the number of information-containing pulses to be converted; input means for applying each of the input pulses in the order of their appearance to a first one of said storage devices; means connected to said register circuit for shifting through said storage devices one ordered input portion of said pulses at said input repetition rate, and another ordered input portion of said pulses at said output repetition rate; an output terminal; a plurality of gating means; first means connecting one each of said gating means to one each of said storage devices; second means connecting said gating means in common to said output terminal; and gating control means connected to said gating means and operative at said output repetition rate for sequentially enabling said gating means connected to said storage means having stored therein, in order of their appearance, pulses of said one input portion, and for enabling a selected one of said gating means connected to one of said storage means during repetitive time intervals when said one storage means has stored therein, in order of their appearance, pulses of said other input portion.

2. A circuit for converting pulses at an input repetition rate to a different output repetition rate comprising a plurality of storage devices, input means for applying said pulses in the order of their appearance to one of said storage devices, pulse advancing means connected in common to all of said storage devices for advancing one ordered portion of said pulses through said storage devices at said input repetition rate and for advancing another ordered portion of said input pulses at said output repetition rate, an output terminal, a plurality of gating means, means connecting said gating means to said storage devices and in common to said output terminal, gating control circuits connected to said gating means, and a gate enabling pulse source connected to said control circuits for applying enabling signals to said gating means at said output repetition rate and in an ordered sequence based on the appearance of said pulses advanced through said storage devices at said input repetition rate, and for repetitively enabling one selected gating means in a repetitive order based on the appearance of said pulses advanced through said storage devices at said output repetition rate.

3. An improved system for altering both the pulse repetition rate and the input pattern of pulses containing bits of a message, said system comprising an input and an output circuit; a source of first repetition rate pulses containing an ordered number of message bits appearing during an active period and an absence of pulses during an equal duration inactive period; means for applying said pulses in serial fashion from said source to said input circuit; a utilization circuit connected to said output circuit and limited to reception of pulses having the same number and order of message bits appearing at a continuous and a second slower repetition rate; a pulse pattern and pulse rate conversion circuit comprising a storage means including individual series-connected storage stages at least less in number than the number of bits in a message for storing in their order of appearance pulses representing bits making up less than the entire message; means connecting said storage means to said input circuit; pulse advancing means connected to said storage means for advancing said pulses through said storage means at said first repetition rate during said active period, and at said second repetition rate during said inactive period; a plurality of gating means connected in parallel to the individual stages of said storage means and connected in common to said output circuit; gating control means operative at said second repetition rate; and means connected between said gating control means and said plurality of gating means for sequentially enabling predetermined ones of said gating means to read out the message bits in their order of appearance as stored in the individual stages during said active period, and for repetitively enabling a single predetermined gating means for reading out in their order of appearance the bits comprising the remainder of the message stored in the individual stages during said inactive period.

4. In an information pattern conversion system having an input and an output circuit, the combination comprising a utilization circuit limited to reception of pulses at a first repetition rate during an active period and an absence of pulses during an equal duration inactive period; a source of continuous input pulses representing a fixed number of message bits appearing in series at a second and slower repetition rate over an inactive and an active period; means for applying said continuous bit-representing input pulses from said source to said input circuit; a pulse conversion circuit including a storage means having less bit storage capacity than the fixed number of message bits connected to said input circuit for receiving said continuous input pulses; pulse advancing means connected to said storage means for preloading a first portion of said input pulses at said second repetition rate during an inactive period, and for serially advancing said preloaded pulses and the remaining input pulses through said storage means at said first repetition rate during an active period; a plurality of gating means connected in parallel to said storage means and connected in common to said output circuit; and gating control means operative at said first repetition rate for reading out in parallel the preloaded pulses in their order of appearance by repetitive enablement of a single predetermined gating means during one portion of said active period, and for reading out in parallel the remaining input pulses in their order of appearance by sequential enablement of the remaining gating means of said plurality during the remaining portion of said active period.

5. In an information handling system, the combination comprising an input circuit and an output circuit, first means for applying to said input circuit during one input interval a first pulse pattern consisting of a given number of high repetition rate pulses representing the bits of a serial message appearing during an active period followed by an absence of pulses during an inactive period, second means for applying to said input circuit during another input interval a second pulse pattern consisting of a continuous train of an equal number of slow repetition rate pulses extending over both said active and inactive periods and representing the bits of another serial message, a pulse conversion circuit connected between said input and said output circuits, said conversion circuit comprising storage means having a series storage capacity at least less than the number of bits in a serial message, said storage mean being connected to said input circuit for storing said input pulse patterns, pulse advancing means connected through said series storage means for advancing said input pulses through said storage means during both of said input intervals at said high repetition rate during active periods and at said low repetition rate during inactive periods, gating means connected to said storage means for reading out message bits in parallel from the storage means and connected in common to said output circuit for applying the message bits in series thereto; and gating enabling means operative at said slow repetition rate simultaneously with the pulse advancing operation in said storage means at both rates during said one input interval for gating out said input pulses representing the serial message in the same order but in said second pulse pattern, and being further operative at said high repetition rate simultaneously with the pulse advancing operation at said storage means at both rates during said other input interval for gating out said input pulses representing the other serial message in the same order but in said first pulse pattern.

6. In an information handling system, the combination in accordance with claim 5, wherein said storage means comprises a shift register circuit having a plurality of stages at least less in number than the number of pulses appearing at said input circuit, and wherein said pulse advancing means comprises a shift lead common to all of said stages of said register circuit.

7. In an information handling system, the combination in accordance with claim 6, wherein said gating means comprises a plurality of gates equal in number to said plurality of shift register stages and an additional gate, each of said gates having an input, an output, and a control lead, first means connecting an input lead from one each of said plurality of gating means individually to one each of said plurality of stages, second means connecting the input lead of said additional gate to a last stage of said shift register, and third means connecting the output leads of said gates in common and to said output circuit, and fourth means connecting said control leads to said gating enabling means.

8. In an information handling system, the combination in accordance with claim 7, wherein said gating enabling means comprises a pulse source having a first timing sequence for applying enabling signals during said one input interval in sequence to said plurality of gates during said active period, and for applying enabling signals, repetitively, to said additional gate during said inactive period.

9. In an information handling system, the combination, in accordance with claim 8, wherein said gating enabling means comprises a pulse source having a second timing sequence during said other input interval for applying enabling signals, repetitively, to a selected one of said plurality of gates during one portion of an active period; and starting with said selected gate during a second portion of said active period, for applying enabling signals sequentially to said plurality of gates in an inverse order from said enabling sequence of said first timing sequence.

10. In an information handling system having interlaced information at an input repetition rate in the form of an information-containing pulse train of a predetermined number of message bits during an active word period followed by an equal duration inactive word period characterized by an absence of information-containing pulses, a pulse rate converter comprising an input and an output terminal and being operative for converting said interlaced information-containing pulse train applied at said input terminal into a continuous pulse train containing the same message and having a different output pulse repetition rate at said output terminal, said pulse rate converter comprising the improvement of a shift register having a number of storage stages at least less than the number of message bits in said predetermined number of message bits, means applying each message bit of a message appearing during an active word period in serial form to said shift register, a source of advance pulses selectively operative for emitting advance pulses at said input repetition rate during an active word period and at said output repetition rate during said inactive word period, means for applying advance pulses from said source to said shift register at said input repetition rate for serially advancing therein in order of their appearance message bits of said message applied to said converter input during said active period, means connected in common to said output terminal and individually connected in parallel to each storage stage of said shift register for reading out in parallel at said output repetition rate individual message bits in their order of appearance at the first and at each successive storage stage in the shift register, means for applying advance pulses from said source to said shift register at said output repetition rate during said inactive word period, and said message bit reading means being operative for continuing to read out in parallel at said output repetition rate the remaining message bits in order of their appearance at the storage stages of said shift register.

11. A circuit for converting input pulses from a source having a pulse pattern of a first repetition rate representing a given number of bits comprising one message during an active period and an equal duration inactive period, to a continuous pulse train pattern of a second slower repetition rate representing the same number and order of bits of said one message and extending over said active and inactive periods, said conversion circuit comprising a shift register circuit having a plurality of stages equal in number to half the pulses present in said active period pattern, pulse applying means connected between said input source and said shift register for serially applying said pulses to a first stage of said shift register, a control source for generating shift control pulses at said first repetition rate during said active period and at said second repetition rate during said inactive period, shift control pulse applying means connected between said source and in common to said plurality of shift register stages for sequentially advancing each of said input pulses in the order of their appearance through said shift register stages, a plurality of gating devices equal in number to said plurality of shift register stages and an additional gating device, each of said gating devices having an input and output and a control terminal, a plurality of means connecting an input from one each of said plurality of gating devices individually to one each of said plurality of shift register stages, means connecting said input of said additional gating device to a last stage of said shift register, a gating control source for generating gate enabling signals at said second repetition rate, means connecting said gating control source to the control terminals of all of said gating devices for enabling said plurality of gating devices in a predetermined sequence during said active period and for enabling said additional gating device repetitively during said inactive period, a utilization circuit limited to reception of pulses at said second repetition rate, and means connecting the output terminal of all of said gating devices in common and to said utilization circuit for presenting said input pulses to said utilization circuit at said second repetition rate.

12. A circuit for converting input pulses at a first repetition rate to a second repetition rate, said circuit comprising a utilization circuit limited to reception of a pulse pattern consisting of an active period in which pulses appear at said second repetition rate and an equal inactive period having an absence of pulses, a register circuit having a plurality of stages less in number than the number of pulses of said active period, an input source having a pulse pattern consisting of a continuous train of pulses at said first repetition rate and extending over said active and inactive periods, means connected between said input source and said register circuit for applying said input pulses to a first stage of said register circuit, a pulse source for generating shift control pulses at said first repetition rate during said inactive period and at said second repetition rate during said active period, means connecting said shift control source to said register circuit for sequentially preloading a first portion of said input pulses in the order of their appearance in all of said stages in said register, a plurality of gating means equal in number to said stages, each of said gating means having an input, an output, and a control terminal, means individually connecting an input terminal from each of said gating means to one each of said stages, means connecting said output terminals of said gating means in common and to said utilization circuit, source means having a number of outputs equal in number to said gating means for applying gating control signals repetitively at said second repetition rate to one output, and thereafter in sequence to the remaining outputs, means individually connecting said one gating control source output to the control terminal of said gating means connected to a last stage in said register for gating out in order of their appearance said preloaded pulses and the next following input pulse, and means individually connecting said remaining control source outputs to said control terminals of said remaining gating means for gating out in the order of their appearance the remainder of said input pulses.

13. In an information handling system, the combination comprising a first information pattern source having an active word period consisting of pulse bursts appearing at a high repetition rate and an equal duration inactive word period having an absence of pulses, said first source having a plurality of outputs for reading out said pulse bursts in parallel, a plurality of pulse conversion circuits each having an input lead and an output lead, means for individually connecting each of said outputs from said first source to one each of said conversion circuit inputs during a first information handling operation, a second information pattern source having pulse bursts appearing at a second slower repetition rate and extending over an active and an inactive word period, said second input source having a plurality of outputs for reading out said pulse bursts in parallel, said connecting means being operative during a second information handling operation for connecting each of said outputs from said second source to one each of said conversion circuit inputs, each of said conversion circuits comprising storage means connected to said input circuits for storing said input pulses, pulse advancing means connected to each of said storage means for advancing said input pulses through said storage means during both of said information handling operations at said high repetition rate during active periods and at said slower repetition rate during inactive periods, an output terminal, gating means connecting said conversion circuit outputs in common to said output terminal, and means connected to said gating means and operative at said slower repetition rate during said first information handling operation for gating out said input pulses in said information pattern, and being further operative at said high repetition rate during said second information handling operation for gating out said input pulses in said first information pattern.

14. In an information handling system, the combination in accordance with claim 13, wherein each of said storage means comprises a shift register circuit having a plurality of stages less in number than the number of pulse bursts in said information patterns, and wherein said pulse advancing means comprises a shift lead common to all of said stages of each of said register circuits.

15. In an information handling system, the combination in accordance with claim 14, wherein said gating means comprises groups of gates each having a plurality of gates equal in number to said plurality of shift register stages, and an additional gate, said gates each having an input, an output, and a control lead, first means connecting an input lead from each one of said plurality of gating means individually to one each of said plurality of stages, second means connecting the input lead of said additional gate to a last stage of said shift register, and third means connecting said control leads to said gate enabling means.

16. In an information handling system, the combination in accordance with claim 15, wherein said gating enabling means comprises a pulse source having a first timing sequence for applying enabling signals during said first information handling operation in sequence to each of said plurality of gates of each group during said active period, and for applying enabling signals repetitively to said additional gate of each group during said inactive period.

17. In an information handling system, the combination in accordance with claim 16, wherein said gating enabling means comprises a pulse source having a second timing sequence during said second information handling operation for applying enabling signals repetitively to a selected one of said plurality of gates of each group during one portion of an active period; and starting with said selected gate during a second portion of said active period, for applying enabling signals sequentially to said plurality of gates of each group in an inverse order from said enabling sequence of said first timing sequence.

References Cited

UNITED STATES PATENTS

| | | | |
|---|---|---|---|
| 3,051,929 | 8/1962 | Smith ____________ | 340—172.5 |
| 3,051,787 | 8/1962 | Parks ____________ | 340—172.5 |
| 3,059,221 | 10/1962 | Page et al. ________ | 340—172.5 |
| 3,135,947 | 6/1964 | Grondin et al. _____ | 340—172.5 |
| 3,193,801 | 7/1965 | Grondin __________ | 340—172.5 |

PAUL J. HENON, *Acting Primary Examiner.*

P. L. BERGER, J. P. VANDENBURG, *Assistant Examiners.*